(12) United States Patent
Zheng

(10) Patent No.: US 10,318,453 B2
(45) Date of Patent: Jun. 11, 2019

(54) SYSTEMS AND METHODS FOR TRANSMITTING INTERRUPTS BETWEEN NODES

(71) Applicant: Marvell World Trade Ltd., St. Michael (BB)

(72) Inventor: Jerry Hongming Zheng, Dublin, CA (US)

(73) Assignee: Marvell World Trade Ltd., St. Michael (BB)

( * ) Notice: Subject to any disclaimer, the term of this patent is extended or adjusted under 35 U.S.C. 154(b) by 275 days.

(21) Appl. No.: 15/220,546

(22) Filed: Jul. 27, 2016

(65) Prior Publication Data

US 2017/0039149 A1  Feb. 9, 2017

Related U.S. Application Data

(60) Provisional application No. 62/200,436, filed on Aug. 3, 2015, provisional application No. 62/200,444, filed
(Continued)

(51) Int. Cl.
*G06F 13/24* (2006.01)
*G06F 13/36* (2006.01)
(Continued)

(52) U.S. Cl.
CPC ............ *G06F 13/24* (2013.01); *G06F 1/08* (2013.01); *G06F 3/0604* (2013.01);
(Continued)

(58) Field of Classification Search
CPC ........ G06F 13/24; G06F 13/36; G06F 13/364; G06F 13/404; G06F 13/4068;
(Continued)

(56) References Cited

U.S. PATENT DOCUMENTS 4,930,103 A * 5/1990 Geiger .................... G06F 13/22
710/113
5,179,704 A * 1/1993 Jibbe ..................... G06F 3/0601
710/262
(Continued)

FOREIGN PATENT DOCUMENTS

EP    0 508 602 A2    10/1992

OTHER PUBLICATIONS

Wong, W., "Q&A: A Deeper Look at Marvell's MoChi Technology," *Electronic Design*, 4 pages (Jun. 6, 2016) (accessed on Jun. 6, 2016 at http://electronicdesign.com/digital-ics/qa-deeper-look-marvell-s-mochi-technology).
(Continued)

*Primary Examiner* — Henry Tsai
*Assistant Examiner* — John B Roche

(57) ABSTRACT

Systems and methods for transmitting a group of interrupts across nodes are provided. A first interrupt signal, comprising a first group of interrupts, is received, with a first node, from a second node. A second interrupt signal, comprising a second group of interrupts, is received, from storage circuitry of the first node, the second interrupt signal represents an interrupt signal received prior to the first interrupt signal. The first interrupt signal is combined with the second interrupt signal using a function to generate a combined interrupt signal. The second interrupt signal is compared to the combined interrupt signal to detect a change in a first bit position of the second interrupt signal. In response to detecting that the first bit position has changed to become asserted, an interrupt process corresponding to the first bit position is performed. The combined signal is stored in place of the second interrupt signal.

20 Claims, 3 Drawing Sheets

Related U.S. Application Data on Aug. 3, 2015, provisional application No. 62/200,452, filed on Aug. 3, 2015, provisional application No. 62/200,462, filed on Aug. 3, 2015, provisional application No. 62/218,296, filed on Sep. 14, 2015.

(51) Int. Cl.

| | | |
|---|---|---|
| *G06F 12/08* | (2016.01) | |
| *G06F 1/08* | (2006.01) | |
| *G06F 3/06* | (2006.01) | |
| *G06F 13/40* | (2006.01) | |
| *H04L 12/741* | (2013.01) | |
| *H04L 12/861* | (2013.01) | |
| *H04L 29/06* | (2006.01) | |
| *H04L 29/08* | (2006.01) | |
| *G06F 13/364* | (2006.01) | |
| *G06F 13/42* | (2006.01) | |
| *G06F 15/78* | (2006.01) | |
| *G06F 9/4401* | (2018.01) | |

(52) U.S. Cl.
CPC .......... *G06F 3/0638* (2013.01); *G06F 3/0683* (2013.01); *G06F 9/4401* (2013.01); *G06F 12/08* (2013.01); *G06F 13/36* (2013.01); *G06F 13/364* (2013.01); *G06F 13/404* (2013.01); *G06F 13/4068* (2013.01); *G06F 13/4282* (2013.01); *G06F 15/7807* (2013.01); *H04L 45/74* (2013.01); *H04L 49/90* (2013.01); *H04L 69/22* (2013.01); *H04L 69/324* (2013.01)

(58) Field of Classification Search
CPC ...... G06F 13/4282; G06F 1/08; G06F 3/0604; G06F 3/0638; G06F 3/0683; G06F 9/4401; G06F 15/7807; H04L 45/74; H04L 49/90; H04L 69/22; H04L 69/324
See application file for complete search history.

(56) References Cited

U.S. PATENT DOCUMENTS

| | | | | |
|---|---|---|---|---|
| 5,815,733 | A * | 9/1998 | Anderson | G06F 13/24 710/36 |
| 5,862,366 | A * | 1/1999 | Schmidt | G06F 11/2231 703/21 |
| 6,263,395 | B1 * | 7/2001 | Ferguson | G06F 13/24 710/262 |
| 6,751,213 | B1 * | 6/2004 | Sun | H04L 12/40163 370/352 |
| 2006/0036792 | A1 | 2/2006 | Chen | |
| 2008/0126812 | A1 * | 5/2008 | Ahmed | H04N 19/61 713/189 |
| 2008/0147946 | A1 | 6/2008 | Pesavento et al. | |
| 2015/0169495 | A1 | 6/2015 | Zheng | |

OTHER PUBLICATIONS

International Search Report and Written Opinion in PCT/US2016/044360 filed Jul. 28, 2016 dated Oct. 7, 2016 (11 pages).

\* cited by examiner

SYSTEMS AND METHODS FOR TRANSMITTING INTERRUPTS BETWEEN NODES

CROSS-REFERENCE TO RELATED APPLICATIONS

This patent application claims the benefit of U.S. Provisional Patent Application No. 62/200,436, filed Aug. 3, 2015, currently pending, and also claims the benefit of U.S. Provisional Patent Application No. 62/200,462, filed Aug. 3, 2015, currently pending, and also claims the benefit of U.S. Provisional Patent Application No. 62/200,444, filed Aug. 3, 2015, currently pending, and also claims the benefit of U.S. Provisional Patent Application No. 62/200,452, filed Aug. 3, 2015, currently pending, and also claims the benefit of U.S. Provisional Patent Application. No. 62/218,296, filed Sep. 14, 2015, currently pending, the disclosures of which are each hereby incorporated by reference herein in their entireties.

FIELD OF USE

The present disclosure relates generally to hopping bus systems, and more particularly to communications in hopping bus systems.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, is neither expressly nor impliedly admitted as prior art against the present disclosure.

Traditional systems allow one device to send one or more interrupts to another device using one or more direct point-to-point connections. Specifically, one device may use a dedicated wire or connection to transmit an interrupt signal to another. Such systems do not scale well when multiple nodes are connected. This is because a dedicated wire in such systems would be required between each of the nodes for sending interrupts. As such, signal routing becomes inefficient and chip routing resources get complicated. For example, in cases where multiple nodes are from different physical chips, direct node-to-node connections for transmitting interrupts become impractical to implement.

SUMMARY

Systems and methods for transmitting a group of interrupts across nodes are provided. In some embodiments, a first interrupt signal, including a first group of interrupts, may be received, with a first node, from a second node. A second interrupt signal, including a second group of interrupts, may be received, from storage circuitry of the first node. The second interrupt signal may represent an interrupt signal received prior to the first interrupt signal. The first interrupt signal may be combined with the second interrupt signal using a function to generate a combined interrupt signal. The second interrupt signal may be compared to the combined interrupt signal to detect a change in a first bit position of the second interrupt signal. In response to detecting that the first bit position has changed to become asserted, an interrupt process corresponding to the first bit position may be performed. The combined signal may be stored in place of the second interrupt signal. In some implementations, the function may be an XOR operation.

In some implementations, the change in the first bit position corresponding to an assertion of the bit in the first bit position may indicate an instruction to begin the interrupt process. The change in the first bit position corresponding to clearance of the bit in the first bit position may indicate termination of the interrupt process.

In some implementations, the first interrupt signal may include node identification information. In such circumstances, a determination may be performed with the first node as to whether the node identification information corresponds to the first node. In response to determining that the node identification information corresponds to the first node, the interrupt process may be performed. In response to determining that the node identification information does not correspond to the first node, the first interrupt signal may be transmitted to a third node without performing the interrupt process. In some implementations, the first, second and third nodes may be individual components of a system coupled over a modular chip (MoChi) network.

In some implementations, the first interrupt signal may be received using a first group of inputs and a second group of inputs of the first node, and wherein a size of the function may correspond to a number of inputs of the first and second groups.

In some implementations, unused bit positions of the first interrupt signal may be masked to generate a masked interrupt signal. Bits in the masked interrupt signal may be shifted by a predetermined number to generate a shifted interrupt signal. In some implementations, the combined interrupt signal may be generated based on the shifted interrupt signal.

In some implementations, a setup procedure may be performed at system startup to set predetermined values of the first node. The predetermined values may include storing identification information of the first node, the unused bit positions of interrupt signals may be stored, and the predetermined number for shifting bits of the interrupt signals may be stored.

In some embodiments, the storage circuitry may include a set of registers corresponding to a number of bits of the interrupt signal.

BRIEF DESCRIPTION OF THE DRAWINGS

The details of one or more implementations are set forth in the accompanying drawings and the description below. Other features and various advantages will be more apparent upon consideration of the following detailed description, taken in conjunction with the accompanying drawings in which.

DETAILED DESCRIPTION

Systems and methods for transmitting interrupts between nodes in a multiple-node system are described. Although this disclosure is described in the context of modular interconnect (MoChi) system, the teachings of this disclosure are equally applicable to any hopping bus system having multiple nodes that transmit interrupts.

Figure 1:
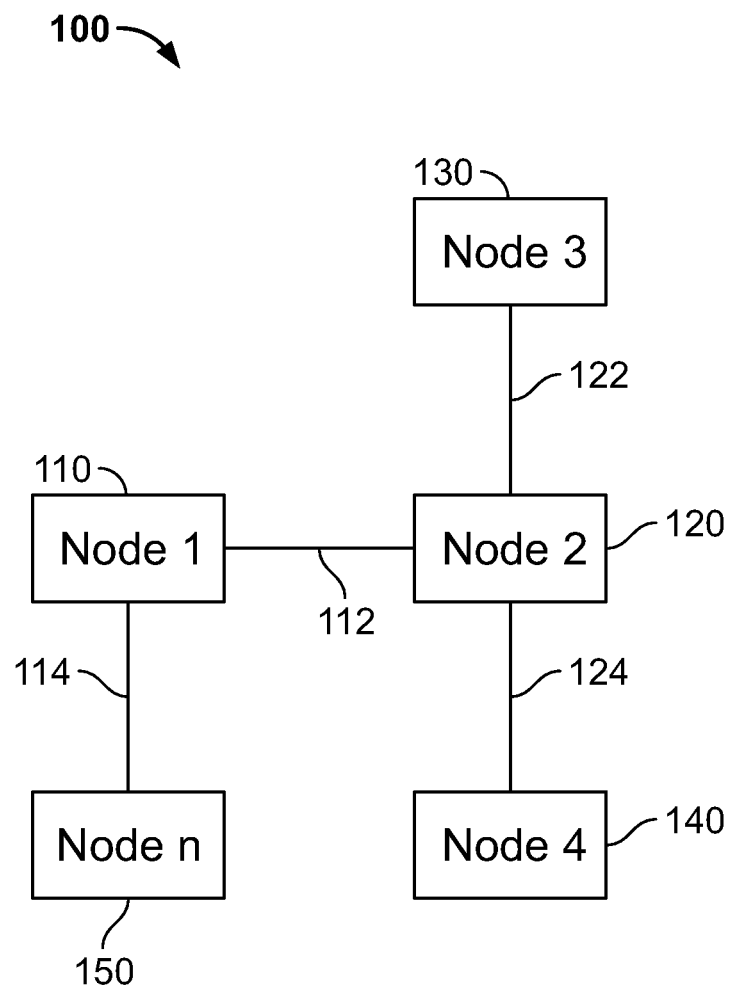
FIG. 1 shows an exemplary multi-node interrupt system in accordance with various embodiments.

FIG. 1 shows an exemplary multi-node interrupt system 100 in accordance with various embodiments. System 100 includes a first node 110, a second node 120, a third node 130, a fourth node 140 and an n-th node 150. In some implementations, first node 110 may communicate with any other node in system 100. For example, first node 110 may communicate with second node 120 or n-th node 150 directly through interconnect 112 or 114, respectively. In addition, first node 110 may communicate with third node 130 or fourth node 140 by sending a communication to second node 120. As defined herein, a "node" is a separate chip, circuit element, or circuit board that includes one or more input ports used to receive and transmit communications from a first node and one or more output ports used to transmit and receive communications from a second node. Each node may include one or more input circuitries, output circuitries, processing circuitries, and storage circuitries. In some implementations, each node is a separate component that connects to other components in a MoChi system or hopping bus system. An exemplary system is described in more detail in commonly owned U.S. patent application Ser. No. 14/564,499, filed on Dec. 9, 2014, which is hereby incorporated by reference in its entirety.

In some implementations, during a start-up phase, first node 110 may be designated as a master node. The master mode may control all or most of the communications in system 100. During the start-up phase, each node in system 100 may be assigned a unique identifier (global identifier). In order to transmit a communication from one node to another, the global identifier may be used. Specifically, first node 110 may transmit a communication to second node 120 via interconnect 112 by specifying the unique identifier of second node 120 in a destination address of the communication. When second node 120 receives a communication with a destination address that matches the assigned unique identifier of second node 120, second node 120 may process the communication locally. In addition, first node 110 may communicate with third node 130 by transmitting a communication to second node 120 that includes a destination address matching the unique identifier of third node 130. Second node 120 may receive the communication with the destination address matching the unique identifier of third node 130. In response to determining that the destination address does not match the unique identifier of second node 120, second node 120 may transmit the communication to third node 130 and fourth node 140. Each of third node 130 and fourth node 140 may receive the communication through respective link 122 and 124. Each of third node 130 and fourth node 140 may determine whether the received communication includes a destination address matching the unique identifier of third node 130 or fourth node 140. In response to third node 130 determining that the unique identifier of third node 130 matches the destination address received in the communication from second node 120, third node 130 may locally process the communication and not pass the communication to any other node.

In some implementations, the communications transmitted between the nodes in system 100 may include interrupts. Each of interconnects 112, 114, 122 and 124 may be a dedicated interrupt link between the corresponding node, in some implementations, each of interconnects 112, 114, 122 and 124 may be used to communicate the destination address corresponding to the interrupt being transmitted. By using the destination address to communicate interrupts between nodes, a direct dedicated connection between two nodes is not necessary to transmit an interrupt between the given nodes. Specifically, first node 110 may transmit an interrupt to third node 130 without having a dedicated connection to third node 130. Instead, first node 110 may transmit the interrupt with a destination address matching third node 130 to second node 120. Second node 120 may pass the received interrupt from first node 110 to third node 130 in response to determining that second node 120 does not have a matching unique identifier to the received destination address from first node 110.

Figure 2:
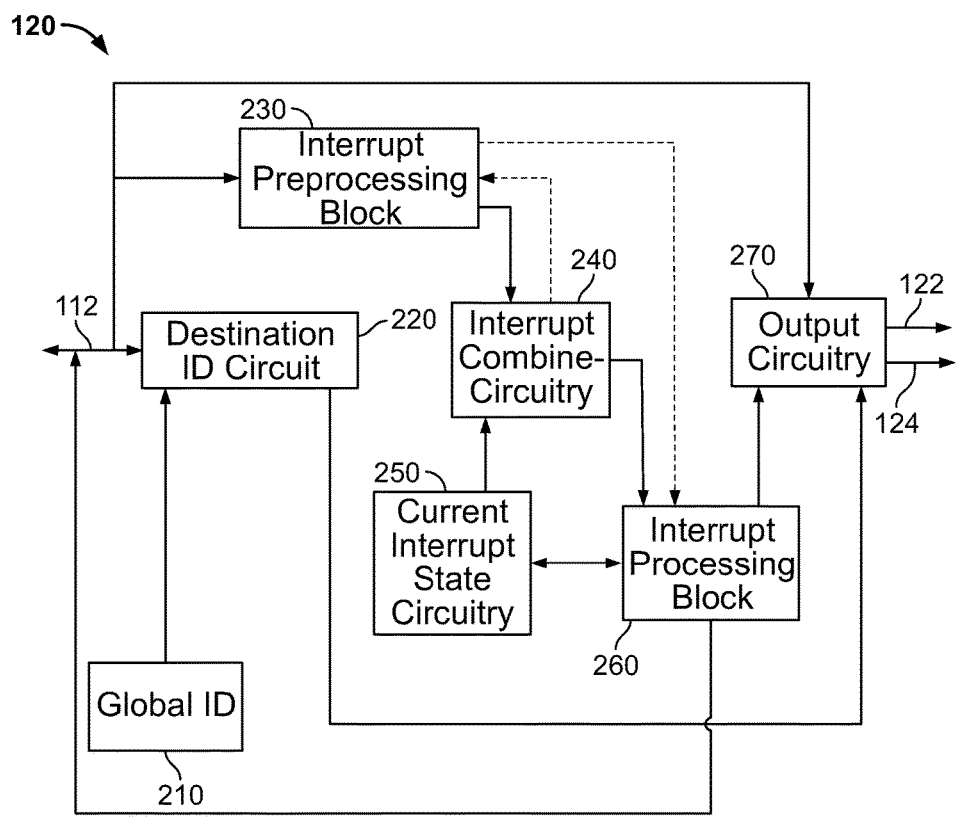
FIG. 2 shows an exemplary interrupt processing subsystem of a node in the multi-node interrupt system in accordance with various embodiments.

FIG. 2 shows an exemplary interrupt processing subsystem of node 120 in the multi-node interrupt system 100 in accordance with various embodiments. Although the below describes an exemplary implementation of interrupt processing subsystem of second node 120, any one of the nodes discussed in system 100 may have the same or similar components and functionality. In addition, although the discussion of FIG. 2 pertains to the transmission of an interrupt from first node 110 to second node 120, the same teachings apply to the transmission of an interrupt between any node in system 100 (FIG. 1).

Subsystem of node 120 may include an interrupt pre-processing block 230, a destination ID circuit 220, a global ID circuit 210, an interrupt combiner circuit 240, a current interrupt state circuit 250, an interrupt processing block 260, and an output circuit 270. Second node 120 may receive an interrupt signal from first node 110 through interconnect 112. Second node 120 may include an input port (not shown) that receives and processes the interrupt signal from first node 110. Each component shown in subsystem of node 120 in FIG. 2 may be duplicated any number of times to create additional interrupt processing groups. In some implementations, multiple interrupt processing groups may be combined to allow one node to transmit an interrupt signal to another using a larger number of connections. For example, subsystem of node 120 shown in FIG. 2 may correspond to a single interrupt processing group that may be limited to receiving a 32-bit interrupt signal using interconnect 112. Such a single interrupt processing group (limited to processing 32-bit interrupt signals) may be combined with another interrupt processing group (also limited to processing 32-bit interrupt signals). The combined group may result in an interrupt processing group capable of processing 64-bit interrupt signals.

In some implementations, an interrupt signal received from first node 110 may include a destination address. In some implementations, second node 120 may receive the destination address from first node 110 using the same interconnect 112 used to transmit the interrupt signal or a separate interconnect (not shown). Destination ID circuit 220 of second node 120 may receive the communication from first node 110 and extract the destination address from the communication. Destination ID circuit 220 may receive a unique identifier of second node 120 that is stored in global ID circuit 210. In some embodiments, global ID circuit 210 may be programmable at startup and may be configured with the unique identifier of second node 120 by storing the assigned unique identifier. In some implementations, the unique identifier may be assigned by the master node (e.g., first node 110).

Destination ID circuit 220 may include a comparator circuit that compares the extracted destination ID received from another node (e.g., first node 110) to the unique identifier (global ID) of second node 120 received from global ID circuit 210. In response to determining that the destination address matches the unique identifier of second node 120, destination ID circuit 220 may instruct output circuitry 270 to not pass the received interrupt signal and destination identifier to another node. In addition, in response to determining that the destination address matches the unique identifier of second node 120, destination ID circuit 220 may instruct interrupt processing components (e.g., interrupt preprocessing block 230, interrupt combiner circuitry 240, current interrupt state circuitry 250 and interrupt processing block 260) to process the interrupt signals. In response to determining that the destination address does not match the unique identifier of second node 120, destination ID circuit 220 may instruct output circuitry 270 to pass the received interrupt signal and destination identifier to another node (e.g., third node 130 and/or fourth node 140).

Interrupt preprocessing block 230 may receive the interrupt signals and modify the interrupt signals to improve system processing of the interrupt signals. In some implementations, interrupt preprocessing block 230 may move data contained in the interrupt signals to one or more other designated bit positions. In some embodiments, the interrupt signals may be provided directly to interrupt combiner circuitry 240 without first passing through interrupt preprocessing block 230. In such circumstances, the interrupt signals may be provided to interrupt preprocessing block 230 after being processed by interrupt combiner circuitry 240 and/or interrupt processing block 260.

Interrupt combiner circuitry 240 may receive the interrupt signals (or modified interrupt signals) and may combine the interrupt signals with a current state of the interrupt signals. Specifically, interrupt combiner circuitry 240 may combine interrupt signals received at one time interval with interrupt signals combined by interrupt combiner circuitry 240 during a second (earlier) time interval. For example, current interrupt state circuitry 250 may store the values of the interrupt signals that were previously received (received before the interrupt signals that are being currently processed by second node 120). Specifically, at a first time interval, an interrupt signal may be received and after being processed, stored in current interrupt state circuitry 250. Current interrupt state circuitry 250 may be implemented using storage circuitry and/or a plurality of registers (e.g., flip-flops and/or latches). At a second time interval (e.g., the current time interval), the interrupt signals may be received from first node 110. During the second time interval, interrupt combiner circuitry 240 may retrieve the interrupt signals from the first time interval from current interrupt state circuitry 250.

Interrupt combiner circuitry 240 may combine the current interrupt signals (e.g., the interrupt signals received from interrupt preprocessing block 230) with the interrupt signals received from current interrupt state circuitry 250 using a function. In some implementations, the function used to combine these interrupt signals may be an XOR logic function.

The output of interrupt combiner circuitry 240 may be provided to interrupt processing block 260 as a combined interrupt signal. Interrupt processing block 260 may detect any change in interrupt state from the previous interrupt state to determine whether to perform an interrupt process. In some embodiments, a bit position in the interrupt signal, received from a given mode that is set, may instruct the receiving node to change the status of the interrupt state. As such, when a bit position in the combined interrupt signals becomes set, second node 120 may be instructed to perform a corresponding interrupt process and may enter the active interrupt state. Alternatively, when a bit position in the combined interrupt signals becomes cleared, second node 120 may be informed that first node 110 has cleared the interrupt and may deactivate the interrupt state.

Specifically, interrupt processing block 260 may compare the combined interrupt signal with the current state of the interrupt signals stored in current interrupt state circuitry 250. In response to detecting that a given bit has changed between the combined interrupt signal and the current state of the interrupt signals, interrupt processing block 260 may perform an interrupt process or disregard the change. In some implementations, when interrupt processing block 260 detects that a given bit, which was not asserted in the current interrupt state, has become asserted in the combined interrupt signal, interrupt processing block 260 may activate the interrupt state. During the active interrupt state, second node 120 may perform an interrupt process (or may instruct a processor of second node 120 to perform an interrupt process) corresponding to the bit position of the asserted bit. Following completion of the interrupt process, second node 120 may instruct or inform first node 110 that the interrupt process has been completed. As a result, first node 110 may transmit a new interrupt signal that results in clearing the bit that has been asserted.

Alternatively, when interrupt processing block 260 detects that a given bit, which was asserted in the current interrupt state, has become cleared in the combined interrupt signal., interrupt processing block 260 may exit the active interrupt state. In addition, second node 120 may determine that first node 110 has been informed that the interrupt process has been completed and cleared the active interrupt state.

In some embodiments, the combined interrupt signal may be stored in current interrupt state circuitry 250. Specifically, the combined interrupt signal may replace the current interrupt state that is stored in interrupt state circuitry 250. For example, interrupt state circuitry 250 may include storage circuitry and/or a plurality of registers (e.g., flip-flops and/or latches, 32 flip-flops or latches (if the interrupt signals are 32-bits wide)). After interrupt combiner circuitry 240 completes combining the current interrupt state (from a first time interval) with the interrupt signals received in a second time interval, the combined signals may be stored in the storage circuitry and/or a plurality of registers (e.g., flip-flops and/or latches, 32 flip-flops or latches clearing or replacing the previously stored contents. Accordingly, when an interrupt signals is received at a third time interval, interrupt combiner circuitry 240 may combine the interrupt signals from the third time interval with the interrupt signals from the second time interval provided by current interrupt state circuitry 250.

Figure 3:
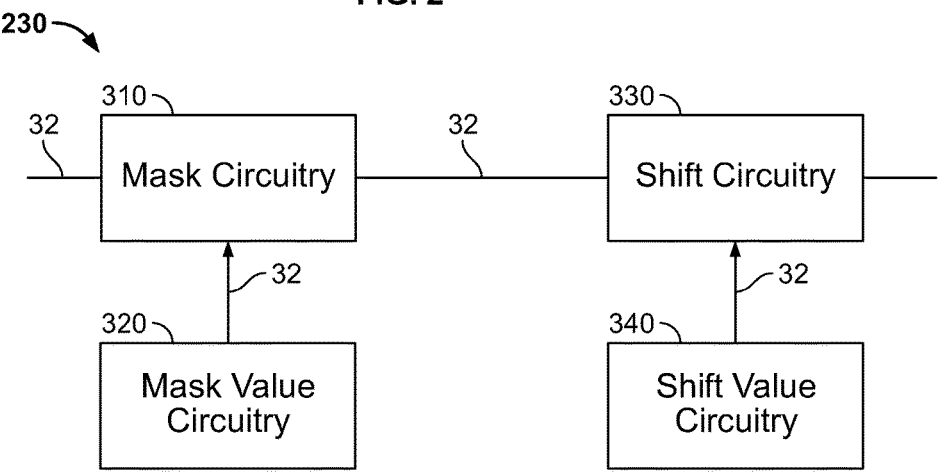
FIG. 3 shows an exemplary interrupt preprocessing block of a node in accordance with various embodiments.

FIG. 3 shows an exemplary interrupt preprocessing block 230 of a node in accordance with various embodiments. Interrupt preprocessing block 230 includes mask circuitry 310, mask value circuitry 320, shift circuitry 330, and shift value circuitry 340. During a startup phase, mask value circuitry 320 and shift value circuitry 330 may be programmed with predetermined values depending on system requirements.

Mask circuitry 310 may receive an input having a number of data bits (e.g., 32 bits of data). Mask circuitry 310 may receive an equal sized number of data bits from mask value circuitry 320. The bit positions that need to be masked may have a value of '0' in the bit position, and those that do not need to be masked may have a value of '1' in the bit positions. For example, if the first 16 bits of data need to be masked, the output of mask value circuitry 320 may include '0's in the first 16 bits. Mask circuitry 310 may include AND logic circuitry that combines the received data bits in a bitwise manner with the data bits from mask value circuitry 320. The output of mask circuitry 310 may be provided to shift circuitry 330.

Shift circuitry 330 may receive an input having a number of data bits (e.g., 32 bits of data) from mask circuitry 310. Shift circuitry 330 may receive a number of data bits from shift value circuitry 340 that indicates how many right or left shift operations need to be performed. For example, if the system needs the values to be moved from the first 16 bit positions to the last 16 bit positions, the output of shift value circuitry 340 may be or correspond to the number 16. Shift circuitry 330 may include shift registers that take received data bits and shift them left or right by a number of bits indicated by shift value circuitry 340.

Figure 4:
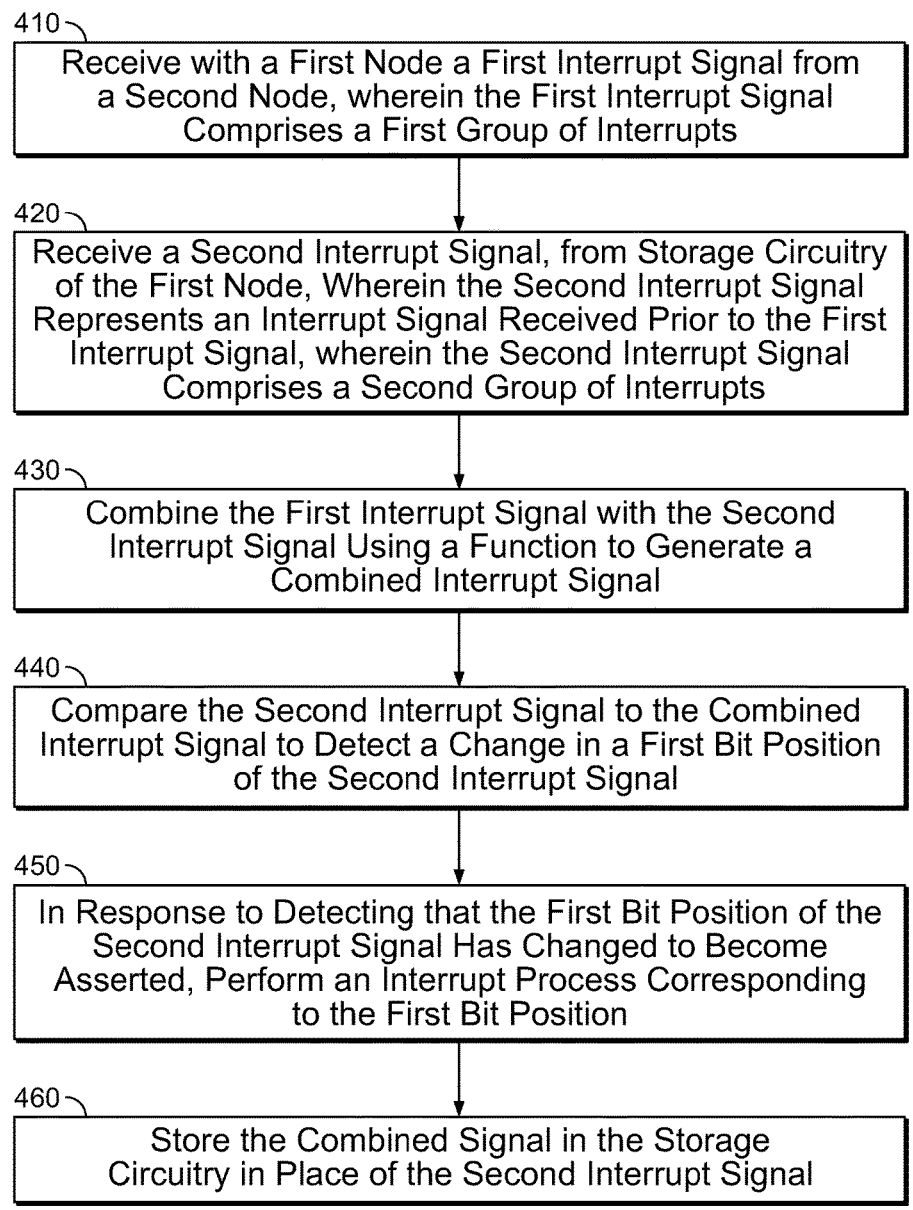
FIG. 4 is an illustrative process for transmitting interrupts between nodes in accordance with various embodiments.

FIG. 4 is an illustrative process 400 for transmitting interrupts between nodes in accordance with various embodiments. At 410, a first node receives a first interrupt signal from a second node, wherein the first interrupt signal comprises a first group of interrupts. For example, second node 120 receives from first node 110 an interrupt signal through interconnect 112 (FIG. 1)

At 420, a second interrupt signal is received, from storage circuitry of the first node, wherein the second interrupt signal represents an interrupt signal received prior to the first interrupt signal, wherein the second interrupt signal comprises a second group of interrupts. For example, interrupt combiner circuitry 240 of second node 120 receives a current interrupt state signal from current interrupt state circuitry 250.

At 430, the first interrupt signal is combined with the second interrupt signal using a function to generate a combined interrupt signal. For example, interrupt combiner circuitry 240 combines the interrupt signal received from first node 110 with the current interrupt state signal received from current interrupt state circuitry 250 (FIG. 2).

At 440, the second interrupt signal is compared to the combined interrupt signal to detect a change in a first bit position of the second interrupt signal. For example, interrupt processing block 260 compares the combined interrupt signal from interrupt combiner circuitry 240 with current interrupt state signal from current interrupt state circuitry 250.

At 450, in response to detecting that the first bit position of the second interrupt signal has changed to become asserted, an interrupt process corresponding to the first bit position is performed. For example, interrupt processing block 260 activates an interrupt process when the bit position is determined to have changed to become asserted.

At 460, the combined signal is stored in the storage circuitry in place of the second interrupt signal. For example, current interrupt state circuitry 250 stores the combined signal from interrupt combiner circuitry 240 in place of the current interrupt state signal stored in current interrupt state circuitry 250.

The foregoing describes methods and an apparatus for transmitting interrupts between nodes. The above-described embodiments of the present disclosure are presented for the purposes of illustration and not of limitation. Furthermore, the present disclosure is not limited to a particular implementation. For example, one or more steps of the methods described above may be performed in a different order (or concurrently) and still achieve desirable results. In addition, the disclosure may be implemented in hardware, such as on an application-specific integrated circuit (ASIC) or on a field-programmable gate array (FPGA). The disclosure may also be implemented in software by, for example, encoding transitory or non-transitory instructions for performing the process discussed above in one or more transitory or non-transitory computer-readable media.

What is claimed is:

1. A method for transmitting a group of interrupts across multiple nodes, the method comprising:
   receiving, with a first node, a first interrupt signal from a second node, wherein the first interrupt signal comprises a first group of interrupts;
   receiving, from storage circuitry of the first node, a second interrupt signal, wherein the second interrupt signal represents an interrupt signal received prior to the first interrupt signal, wherein the second interrupt signal comprises a second group of interrupts;
   combining the first interrupt signal with the second interrupt signal using a function to generate a combined interrupt signal;
   comparing the second interrupt signal to the combined interrupt signal to detect a change in a first bit position of the second interrupt signal;
   in response to detecting that the first bit position of the second interrupt signal has changed to become asserted, performing an interrupt process corresponding to the first bit position; and
   storing the combined signal in the storage circuitry in place of the second interrupt signal.

2. The method of claim 1, wherein the change in the first bit position corresponding to an assertion of the bit in the first bit position indicates an instruction to begin the interrupt process, and wherein the change in the first bit position corresponding to clearance of the bit in the first bit position indicates termination of the interrupt process.

3. The method of claim 1, wherein the first interrupt signal comprises node identification information, further comprising:
   determining with the first node whether the node identification information corresponds to the first node;
   in response to determining that the node identification information corresponds to the first node, performing the interrupt process; and
   in response to determining that the node identification information does not correspond to the first node transmitting the first interrupt signal to a third node without performing the interrupt process.

4. The method of claim 3, wherein the first, second and third nodes are individual components of a system coupled over a modular chip (MoChi) network.

5. The method of claim 1, wherein the function is an XOR operation.

6. The method of claim 1, wherein the first interrupt signal is received using a first group of inputs and a second group of inputs of the first node, and wherein a size of the function corresponds to a number of inputs of the first and second groups.

7. The method of claim 1 further comprising:
   masking unused bit positions of the first interrupt signal to generate a masked interrupt signal; and
   shifting bits in the masked interrupt signal by a predetermined number to generate a shifted interrupt signal.

8. The method of claim 7, wherein the combined interrupt signal is generated based on the shifted interrupt signal.

9. The method of claim 7 further comprising performing a setup procedure at system startup to set predetermined values of the first node, wherein the predetermined values include storing identification information of the first node, storing the unused bit positions of interrupt signals, and storing the predetermined number for shifting bits of the interrupt signals.

10. The method of claim 1, wherein the storage circuitry comprises a set of registers corresponding to a number of bits of the interrupt signal.

11. A system for transmitting a group of interrupts across multiple nodes, the system comprising:
input circuitry configured to receive, with a first node, a first interrupt signal from a second node, wherein the first interrupt signal comprises a first group of interrupts;
combiner circuitry configured to:
receive, from storage circuitry of the first node, a second interrupt signal, wherein the second interrupt signal represents an interrupt signal received prior to the first interrupt signal, wherein the second interrupt signal comprises a second group of interrupts; and
combine the first interrupt signal from the input circuitry with the second interrupt signal using a function to generate a combined interrupt signal; and
processing circuitry configured to:
compare the second interrupt signal from the storage circuitry to the combined interrupt signal from the combiner circuitry to detect a change in a first bit position of the second interrupt signal; and
in response to detecting that the first bit position of the second interrupt signal has changed to become asserted, perform an interrupt process corresponding to the first bit position; and
store the combined signal in the storage circuitry in place of the second interrupt signal.

12. The system of claim 11, wherein the change in the first bit position corresponding to an assertion of the bit in the first bit position indicates an instruction to begin the interrupt process, and wherein the change in the first bit position corresponding to clearance of the bit in the first bit position indicates termination of the interrupt process.

13. The system of claim 11, wherein the first interrupt signal comprises node identification information, further comprising:
destination circuitry configured to:
determine with the first node whether the node identification information corresponds to the first node;
in response to determining that the node identification information corresponds to the first node, perform the interrupt process; and
in response to determining that the node identification information does not correspond to the first node transmit the first interrupt signal to a third node without performing the interrupt process.

14. The system of claim 13, wherein the first, second and third nodes are individual components of a system coupled over a modular chip (MoChi) network.

15. The system of claim 11, wherein the function is an XOR operation.

16. The system of claim 11, wherein the first interrupt signal is received using a first group of inputs and a second group of inputs of the first node, and wherein a size of the function corresponds to a number of inputs of the first and second groups.

17. The system of claim 11 further comprising:
mask circuitry configured to mask unused bit positions of the first interrupt signal to generate a masked interrupt signal; and
shifting circuitry configured to shift bits in the masked interrupt signal by a predetermined number to generate a shifted interrupt signal.

18. The system of claim 17, wherein the combined interrupt signal is generated based on the shifted interrupt signal.

19. The system of claim 17 further comprising a master node configured to perform a setup procedure at system startup to set predetermined values of the first node, wherein the predetermined values include identification information of the first node, the unused bit positions of interrupt signals, and the predetermined number for shifting bits of the interrupt signals.

20. The system of claim 11, wherein the storage circuitry comprises a set of registers corresponding to a number of bits of the interrupt signal.

* * * * *